United States Patent [19]
Wieg et al.

[11] 4,233,406
[45] Nov. 11, 1980

[54] PROCESS FOR THE ENZYMATIC TREATMENT OF WASTE WATER OF WHEAT STARCH PLANTS

[75] Inventors: Andras J. Wieg, Amsterdam, Netherlands; Günther Jäckering, Hamm, Fed. Rep. of Germany

[73] Assignees: Naarden International N.V., Naarden-Bussum, Netherlands; Altenburger Maschinen KG Jaeckering & Co., Hamm, Fed. Rep. of Germany

[21] Appl. No.: 951,077

[22] Filed: Oct. 13, 1978

[30] Foreign Application Priority Data

Oct. 12, 1977 [NL] Netherlands ............... 7711211

[51] Int. Cl.² .................................................. C13L 1/00
[52] U.S. Cl. .................................... 435/275; 435/272; 435/274; 426/53; 210/606
[58] Field of Search ................. 195/2, 4, 7–9; 210/2, 11, 12; 127/69; 426/48, 52, 53; 435/275, 272, 274

[56] References Cited

U.S. PATENT DOCUMENTS 3,782,964  1/1974  Knight ........................... 195/4 X

FOREIGN PATENT DOCUMENTS

52/33353  3/1977  Japan .

*Primary Examiner*—Lionel M. Shapiro
*Attorney, Agent, or Firm*—Brumbaugh, Graves, Donohue & Raymond

[57] ABSTRACT

A process for the enzymatic streatment of waste water of wheat starch plants in which the waste water is subjected before or alternating with the first steps of the concentration process to a process at least consisting of
(a) a heat treatment followed by separation of the solid substance, and
(b) a treatment with enzyme preparations exhibiting amylase and/or cellulase and/or hemi-cellulase activity and optionally glucoamylase and/or β-glucanase activity.

13 Claims, No Drawings

PROCESS FOR THE ENZYMATIC TREATMENT OF WASTE WATER OF WHEAT STARCH PLANTS

The invention relates to a process for the removal of said impurities dissolved and undissolved impurities from the waste water of wheat starch plants. The invention especially relates to the enzymatic treatment of said impurities to facilitate the removal from the waste water.

In the production of starch from wheat the starch is first broken up by milling the wheat and mixing the flour with water. The starch is then separated from the other components of the wheat grain such as fibres, cell-walls (cellulose and hemi-cellulose) and protein. The starch is subsequently separated from water by settling and/or by means of centrifuges or hydrocyclones e.g. and is then dried. The whole process for the production of starch requires the steady supply of substantial amounts of expensive pure water. A substantial amount of waste water mainly comprising residual starch, protein, cellulose, hemi-cellulose, gums and pentosans in dissolved and suspended form is obtained. Said waste water has a very high BOD (biochemical oxygen demand) and thus cannot be drained into the public surface water. A biological purification of said waste water with activated sludge requires a big capacity purification plant. Thus there has been a search for methods to remove as much as possible of the impurities from the waste water before it is drained to a purification plant.

Japanese patent application (Kokai) No. 52,033353, laid open to public inspection on Mar. 14, 1977, teaches the treatment of starch-containing waste water with fixed gluco amylase, before it is subjected to a further purification with active sludge. Although such an enzymatic pre-treatment possibly accelerates the further biological degradation, it does not diminish the oxygen demand (BOD).

Efforts have been made to concentrate the waste water from the production of wheat starch to obtain a distillate with a low BOD that can be drained off easily and to try to recover some useful components from the residue. Said waste water has a dry substance content of up to 5%; however, in most cases between 1.5 and 4%. On a laboratory scale it is possible to reduce the volume up to a dry solids contents of 25%. However, on upsealing the process a maximum of 13% to 18% is reached. Further reduction of the volume causes excessive foam formation leading to a strong pollution of the distillate. Furthermore, there is a strong viscosity increase of the mixture to be evaporated, and a starch and protein deposit in the evaporators. By consequence said evaporators show a strong pollution and are rapidly blocked. Also, only when the undissolved impurities are removed, is it possible to evaporate further to a dry substance content of 15% to 18%. It has been proposed to liquefy the starch in the waste water to prevent a gelatinization by addition of an enzyme which has not been specified (D. Muml/u/ ller-Mangold, Die Stuml/a/ rke 27 (1975) page 205). It appeared, however, that the liquefaction of the starch by treatment with amylase before the evaporation indeed gives a partial solution, but at a dry substance contents of 25% the strong viscosity increase of the waste water and pollution of evaporators occurs again.

It has now surprisingly been found, that the waste water of the production of wheat starch can be concentrated in a high degree when the waste water before or alternating with the first steps of the concentration process, is subjected to a process at least comprising the following steps (although not necessarily in the same sequence):

(a) a heat treatment followed by separation of the solid substances, and (b) a treatment with enzyme preparations exhibiting amylase and/or cellulase and/or hemi-cellulase activity and optionally glucoamylase and/or $\beta$-glucanase activity.

The distillate obtained by the subsequent concentration has a very low BOD and can be drained into the surface water without any further treatment. By careful concentration it is even possible to recirculate the distillate as process water. The solid components that can be separated after the heat treatment have a high protein content and can optionally be added to the wheat gluten, which are obtained as a by-product in the production of wheat starch. The residue obtained by the concentration can, after an optional further drying step, be used as a cattle-fodder.

In practice the treatments required according to the present invention can be performed in different manners and in different subsequences.

When the enzymatic step is limited to a treatment with amylase or cellulase and/or hemi-cellulase the clear waste water remaining after the separation of the solid components can be concentrated to a dry substance contents of 35 to 45%. When the waste water is treated both with $\alpha$-amylase and with cellulase and hemi-cellulase and optionally with glucoamylase too, it is even possible to reach a dry substance content of 70 to 75%. According to the most simple embodiment of the present process the waste water is first subjected to a heat treatment, preferably at 60°–100° C., the solid components are separated, by filtration, sedimentation or centrifugation for instance and then the enzymatic treatment is applied onto the clear filtrate.

The embodiment can be such that the $\alpha$-amylase and cellulase/hemi-cellulase and optionally the glucoamylase and/or $\alpha$-glucanase activity are applied simultaneously, however, this is not necessary. Of course, it is possible to use preparations which can be obtained on the market and which exhibit some of the above-mentioned activities. In view of the fact, that the enzymatic treatment, and namely the treatment with $\alpha$-amylase, is preferably performed within a temperature range which at least partially overlaps that of the preferred temperature range of the heat treatment, it will be beneficial to combine the heat treatment and the treatment with $\alpha$-amylase, and optionally with cellulase/hemi-cellulase and gluco-amylase/$\alpha$-glucanase and then to separate the protein rich solid components. When the waste water is not treated with cellulase or hemi-cellulase before the separation of the solid components, said treatment can be performed immediately after the separation or after the waste water has been pre-concentrated by evaporation. Finally the waste water treated according to the present invention is concentrated to the dry substance contents desired. Said embodiments can be applied directly onto the waste water resulting from the production of starch (dry substance contents ca. 1.5 to 4%). It is also possible to pre-concentrate said waste water by evaporation, for instance to a dry substance contents of 8 to 10%, before performing the enzymatic treatment.

It will be clear to the expert, that there are a lot of variations from said method of waste water treatment, which are all within the scope of the present invention.

The usual industrial evaporation apparatus can be used for the concentration, such as down draft evaporators. The enzymatic treatments are preferably performed within the temperature ranges which are the most favourable for the enzymes in question. The liquid heating apparatus known for such processes, jetcoockers e.g., can be used to heat the waste water. When necessary the pH value of the waste water should be adjusted within the pH ranges suitable for the enzymatic treatment.

The amounts of enzyme needed for the waste water treatment according to the invention are not critical. It is expedient to choose them such that the treatment is performed within a reasonable time. So an α-amylase activity of 100.000 to 1.000.000 MWU (modified Wohlgemuth-units) per kg dry substance in the waste water is used, by preference. When the temperature is maintained between 60° and 110° C. and the pH value is maintained between 5 and 7.5 the α-amylase treatment will in general require about 10 to 120 minutes.

It is also preferred to use a total cellulase and hemi-cellulase activity, respectively, from 300 to 12.000 CU (cellulase-units) and/or 300 to 12.000 HU (hemi-cellulase-units) per kg dry substance in the waste water '). At a temperature of 30° to 80° C. and a pH value of 4 to 6, the treatment will in general require 10 to 240 minutes. When desired the activity can be spread over some treating steps.

When the treatment with α-amylase and cellulase/-hemi-cellulase is performed simultaneously the temperature and the pH value should be adjusted at the value suited for both processes. It is expedient to choose the components of enzymes to be added such that both processes are completed at about the same time.

(') The cellulase activity of an enzyme preparation is defined as follows:

A solution of 938 mg carboxymethyl cellulose (70 C high of Hercules) in 500 ml of water is treated with w mg enzyme preparation at 40° C. and pH 4.4. The change in viscosity is measured as a function of the reaction time by means of an Ostwald-Cannon-Fenske visco meter.

$$\text{Activity} = \frac{1000 (F_{10} - F_5)}{w} \, CE/g.$$

Herein are $F_{10}$ and $F_5$ the relative fluidity after 10 and 5 minutes, respectively.

The relative fluidity $F_t$ at time T is defined:

$$F_t \frac{Ti - Tw}{T_t - T_w}$$

wherein $T_w$ is the rate of flow of the leaving water, $T_i$ is the rate of flow of the substrate before it is treated with the enzyme and $T_t$ is the rate of flow of the substrate after that it has been treated with the enzyme during time t.

The hemi-cellulase activity of an enzyme preparation is defined in an analogous way by means of an 0.2%'s solution of Locust bean gum at 40° C. and pH 4.5.

$$\text{Activity} = \frac{1000 (F_{10} - F_5)}{w} \, He/g$$

wherein w, $F_{10}$ and $F_5$ have the meanings indicated above.

The present invention is illustrated by the following non-limitative examples.

EXAMPLE I (Prior art)

Waste water of an plant for the production of wheat starch having the following properties:

a=dry substance contents
b=protein contents
c=ash contents
d=contents of other organic material a:1.7 weight % calculated on dry substance:100 weight % b:0.3 weight % calculated on dry substance:17.6 weight % c:0.06 weight % calculated on dry substance:3.5 weight % d:1.34 weight % calculated on dry substance:78.9 weight % pH:6.5; BOD:16,000 ml/l was concentrated in a 3-step down draft evaporator. It appeared to be impossible to concentrate further than up to 13 weight percent of dry substance.

The viscosity increased up to 20,000 cP. The concentrator became so polluted in a few hours that an immediate cleaning was necessary. It was tried to further concentrate the waste water after the undissolved components had been separated. Said separation was incomplete and the remaining waste water was still very turbid. The waste water which has been treated in this manner could not be concentrated further than up to 15 weight percent, dry substance.

In both cases the concentrated waste water foamed to such an extent that the distillate was contaminated with it.

EXAMPLE II

Waste water of the composition according to example I was introduced continuously in a jetcoocker at 85° C. and treated with a liquid bacterial α-amylase preparation having an activity of 420,000 MWU per ml preparation. 1.5 ml of preparation were dosed per kg dry substance into the waste water. The waste water was maintained an; other two hours in a flow-through boiler whereby continuously a further 0.5 ml of α-amylase preparation per kg dry substance was dosed. After this treatment the waste water was iodine-negative from which appears that only dextrines with less than 12 glucose units per mol were present after the treatment, the waste water contained a very good separable flocculent precipitate. The product was obtained without any separation of the concentration as a whole in a 3-step down draft evaporator. At the dry substance contents of 25% the viscosity had increased to 3000 cP (at 30° C.) and the difficulties mentioned in example I became manifest.

EXAMPLE III

Waste water of the composition according to example I was treated with α-amylase as described in example II and the flocculent precipitate was then separated in a continuously working centrifuge. The thus obtained upper-layer could be concentrated without any problems to a dry substance content of 40%, whereby the viscosity increased to 2000 cP. Said concentrated product had the following composition (calculated on dry substance):

glucose and fructose 9.6 weight percent
malto-oilgosaccharides 29.2 weight percent
protein 19.8 weight percent
other substances 41.4 weight percent The distillate obtained from the concentrator has a BOD of only circa 150 mg/l. The sludge obtained by the centrifugation was further concentrated in a batch centrifuge. It had the following composition (calculated on dry substance):

glucose and fructose:3.2 weight percent
malto-oligosaccharides 12.1 weight percent
protein 59.0 weight percent
other substances 25.7 weight percent The sludge represented 10% of the dry substance introduced with the waste water.

EXAMPLE IV

The waste water of example III concentrated to a dry substance contents of 40 weight percent was treated at 50° C. and pH 4.5 with an enzyme preparation having a cellulase, α-glucanase and hemi-cellulase activity (4000 CU and 3000 HU per g preparation). Enzyme dosage: 1 g preparation per kg dry substance. After a reaction time of 30 minutes the viscosity of the concentrated waste water had decreased from 2000 cP to 45 cP. Said product could be concentrated to 70% dry substance contents without any difficulties.

EXAMPLE V

The waste water of the composition according to example I was treated with α-amylase as described in example II; and subsequently chilled to 50° C. and treated with the cellulase/hemi-cellulose preparation described in example IV; dosis:1 g per kg dry substance. After a reaction/time of 60 minutes the waste water was subjected to a sedimentation in a container. After standing for period of three hours the clear upper-layer was drained off by means of a siphon. The product was concentrated without any problems to a dry substance contents of 70 weight percent. The sludge was concentrated further in a batch centrifuge and dried. Analysis (calculated on dry substance):

|  | concentrated upper-layer | mud |
| --- | --- | --- |
| Glucose and fructose | 13.1 weight % | 3.3 weight % |
| malto-oligosaccharides | 32.3 weight % | 13.4 weight % |
| protein | 19.4 weight % | 61.2 weight % |
| other substances | 35.2 weight % | 22.1 weight % |

EXAMPLE VI

Waste water of the composition of example I was treated as described in example V with the provision that glucoamylase was added simultaneously; dose:100 GAU/kg dry substance '). Analysis (calculated on dry substance):

|  | concentrated upper-layer | mud |
| --- | --- | --- |
| Glucose | 47.0 weight % | 14.0 weight % |
| fructose | 1.5 weight % | 2.0 weight % |
| protein | 19.2 weight % | 62.7 weight % |
| other substances | 32.3 weight % | 21.3 weight % |

(') 1 GAU (glucoamylase unit) is the amount of glucoamylase catalysing in 1 hour the production of 1 g of glucose from soluble starch at 60° C. and a pH value of 4.2.

EXAMPLE VII

Waste water of the composition of example I was heated at 80° C. for 1 hour. The flocculent precipitate was subsequently separated in a continuously working centrifuge. The sludge obtained was further concentrated in a batch centrifuge and contained 65% by weight of protein calculated on dry substance. The clear upper-layer could not be concentrated further than 18 percent by weight of dry substance due to a viscosity increase of up to circa 8000 cP. When the clear upper-layer was treated with an enzyme preparation having cellulase-hemi-cellulase and glucoamylase activity (dose 4000 CU, 3000 HU and 100 GAU per kg dry substance) at 50° C., and a pH of 4.5, then it could be concentrated up to 45 weight percent of dry substance.

We claim:

1. A process for the purification of waste water of a plant for the production of wheat starch wherein said waste water is subjected, in any sequence, to treatment steps comprising:
    (a) a heat treatment followed by the separation of the solid substance; and
    (b) a treatment of said waste water with one or more of the enzymes α-amylase, cellulase, and hemicellulase and, optionally, with one or more of the enzymes glucoamylase, and α-glucanase.

2. The process of claim 1, whereby the waste water subject to purification is concentrated too.

3. A process for the purification by concentration and simultaneous enzymatic treatment of waste water of a plant for the production of wheat starch wherein said waste water is subjected before, or alternated with, the first steps of said concentration, one or more times, to treatment steps comprising:
    (a) a heat treatment followed by a separation of undissolved solid substance; and
    (b) a treatment of said waste water with enzyme preparations having α-amylase, cellulase and/or hemicellulase activity.

4. The process of claim 3, characterized by using enzyme preparations having glucoamylase and/or α-glucanase activity too.

5. The process of claims 3 or 4, characterized in that the heat treatment is combined with an concentration.

6. The process of claim 3 or 4, characterized in that the enzyme and the heat treatment are combined and a solid component is separated.

7. The process of claims 3 or 4, characterized in that the waste water subject to the purification is preconcentrated by evaporation.

8. The process of claims 3 or 4, characterized by using an α-amylase activity of 100.000 to 1.000.000 M.W.E. per kg dry substance in the waste water.

9. The process of claim 8, characterized by performing the treatment at pH 5–7.5 and 60° to 110° C.

10. The process of claims 3 or 4, characterized by using a cellulase and/or hemi-cellulase activity of 300–12.000 CU and/or 300–12.000 HU per kg dry substance in the waste water, respectively.

11. A process of claim 10, characterized by performing the treatment at pH 4–6 and 30° to 80° C.

12. The process of claims 9 or 11, characterized by using both a preparation having α-amylase activity and a preparation having cellulase and/or hemi-cellulase activity and performing the treatment at pH 5–6 and 60° to 80° C.

13. The process according to claim 12, characterized in that the quantities of the enzyme added are choosen such that the treatment with α-amylase and cellulase and/or hemi-cellulase are completed about the same time.

* * * * *

UNITED STATES PATENT AND TRADEMARK OFFICE
CERTIFICATE OF CORRECTION

PATENT NO. : 4,233,406

DATED : November 11, 1980

INVENTOR(S) : Wieg et al.

It is certified that error appears in the above—identified patent and that said Letters Patent is hereby corrected as shown below:

Column 1, Line 6, delete "said impurities";

Column 1, Line 9, after "removal" insert --of said impurities--;

Column 1, Line 47, "contents" should read --content--;

Column 1, Lines 47 & 48, "upsealing" should read --upscaling--;

Column 1, Line 60, "(D.Muml/u/ ller-Mangold, Die Stuml/a/ rke" should read --(D.Müller-Mangold, Die Starke--;

Column 2, Line 54, "α-glucanase" should read --β-glucanase--;

UNITED STATES PATENT AND TRADEMARK OFFICE
CERTIFICATE OF CORRECTION

PATENT NO. : 4,233,406

DATED : November 11, 1980

INVENTOR(S) : Wieg et al.

It is certified that error appears in the above—identified patent and that said Letters Patent is hereby corrected as shown below:

Column 4, Line 56, "present after" should read --present. After--;

Column 5, Line 8, "oilgosaccharides" should read --oligosaccharides--;

Column 5, Line 12, "has" should read --had--;

Column 5, Line 29, "α-glucanase" should read --β-glucanase--;

Column 6, Line 41, "α-glucanase" should read --β-glucanase--;

Column 6, Lines 56 & 57, "α-glucanase" should read --β-glucanase--; and

Column 6, Line 60, "claim 3 or 4" should read --claims 3 or 4".

Signed and Sealed this

Twenty-sixth Day of May 1981

[SEAL]

Attest:

RENE D. TEGTMEYER

Attesting Officer     Acting Commissioner of Patents and Trademarks